(12) United States Patent
Ito et al.

(10) Patent No.: US 7,541,305 B2
(45) Date of Patent: *Jun. 2, 2009

(54) DIELECTRIC CERAMIC COMPOSITION AND ELECTRONIC DEVICE

(75) Inventors: Kazushige Ito, Chuo-ku (JP); Akira Sato, Chuo-ku (JP); Taku Murase, Chuo-ku (JP)

(73) Assignee: TDK Corporation, Tokyo (JP)

( * ) Notice: Subject to any disclaimer, the term of this patent is extended or adjusted under 35 U.S.C. 154(b) by 92 days.

This patent is subject to a terminal disclaimer.

(21) Appl. No.: 11/212,617

(22) Filed: Aug. 29, 2005

(65) Prior Publication Data

US 2006/0046921 A1 Mar. 2, 2006

(30) Foreign Application Priority Data

Aug. 30, 2004 (JP) .............................. 2004-250944

(51) Int. Cl.
*C04B 35/465* (2006.01)
*C04B 35/468* (2006.01)
*C04B 35/49* (2006.01)

(52) U.S. Cl. ....................... 501/135; 501/136; 501/138; 501/139

(58) Field of Classification Search ................. 501/136, 501/137, 138, 139, 135
See application file for complete search history.

(56) References Cited

U.S. PATENT DOCUMENTS

| | | | |
|---|---|---|---|
| 5,646,080 A | 7/1997 | Chu et al. | |
| 6,225,250 B1 | 5/2001 | Wada et al. | |
| 6,556,422 B2 * | 4/2003 | Kim et al. | 361/321.2 |
| 6,809,052 B2 * | 10/2004 | Horie et al. | 501/138 |
| 6,829,137 B2 | 12/2004 | Konaka et al. | |
| 6,853,536 B2 | 2/2005 | Nakamura et al. | |
| 6,876,538 B1 * | 4/2005 | Kim et al. | 361/321.4 |
| 6,960,547 B2 * | 11/2005 | Matoba et al. | 501/139 |
| 6,962,888 B2 * | 11/2005 | Watanabe et al. | 501/136 |
| 7,042,707 B2 * | 5/2006 | Umeda et al. | 361/321.2 |
| 7,157,396 B2 * | 1/2007 | Watanabe et al. | 501/135 |
| 7,265,072 B2 * | 9/2007 | Watanabe et al. | 501/136 |
| 2001/0036896 A1 | 11/2001 | Wada et al. | |
| 2004/0038800 A1 | 2/2004 | Horie et al. | |

FOREIGN PATENT DOCUMENTS

| | | |
|---|---|---|
| EP | 0 774 448 A1 | 5/1997 |
| EP | 1 094 477 A2 | 4/2001 |
| EP | 1 327 616 A2 | 7/2003 |
| JP | A-04-292458 | 10/1992 |
| JP | A-04-292459 | 10/1992 |
| JP | A-04-295048 | 10/1992 |
| JP | A-05-109319 | 4/1993 |
| JP | A-06-243721 | 9/1994 |
| JP | A-09-040465 | 2/1997 |
| JP | A-10-025157 | 1/1998 |
| JP | A-11-302072 | 11/1999 |
| JP | A-2000-154057 | 6/2000 |
| JP | A-2001-192264 | 7/2001 |
| JP | A-2002-255639 | 9/2002 |
| JP | A 2004-214539 | 7/2004 |
| JP | A 2004-224653 | 8/2004 |

\* cited by examiner

*Primary Examiner*—Karl E Group
(74) *Attorney, Agent, or Firm*—Oliff & Berridge, PLC

(57) ABSTRACT

A dielectric ceramic composition having a main ingredient including a dielectric oxide expressed by the formula $\{(Me_{1-x}Ca_x)O\}_m \cdot (Zr_{1-y}Ti_y)O_2$, where the symbol Me indicating the name of the element in said formula is at least one of Sr, Mg, and Ba and where the symbols m, x, and y indicating the molar ratios of the formulation in the formula are in relationships of $0.995 \leq m \leq 1.020$, $0 < x \leq 0.15$, and $0 \leq y \leq 1.00$, a first sub ingredient including an oxide of R (where R is a rare earth element), a second sub ingredient including an oxide of Mg, and a third sub ingredient including an oxide of Mn, wherein the ratios of the sub ingredients with respect to 100 moles of the main ingredient are first sub ingredient: 0.1 to 6 moles (value converted to oxide of R), second sub ingredient: 0.1 to 5 moles (value converted to oxide of Mg), and third sub ingredient: 0.1 to 2.5 moles (value converted to oxide of Mn), said dielectric ceramic composition further having as a fourth sub ingredient an oxide of A (where A is at least one type of element selected from the group of anionic elements having an effective ion radius at the time of hexacoordination of 0.065 nm to 0.085 nm).

9 Claims, 1 Drawing Sheet

DIELECTRIC CERAMIC COMPOSITION AND ELECTRONIC DEVICE

BACKGROUND OF THE INVENTION

1. Field of the Invention

The present invention relates to a dielectric ceramic composition having reduction resistance and a multilayer ceramic capacitor or electronic device using such a dielectric ceramic composition.

2. Description of the Related Art

An electronic device constituted by a multilayer ceramic capacitor is required to be high in relative dielectric constant, long in insulation resistance IR life, and good in DC bias characteristic (little change of relative dielectric constant along with time) and also good in temperature characteristics. In particular, depending on the application, it is required to have flat temperature characteristics under stringent conditions. In recent years, multilayer ceramic capacitors have come to be used in engine electronic control units (ECU), crank angle sensors, antilock braking system (ABS) modules, or other various types of electronic apparatuses mounted in automotive engine compartments. These electronic apparatuses are for ensuring stable engine control, drive control, and brake control, so the temperature stability of the circuits has to be good.

The environment in which these electronic systems are used falls in temperature to −20° C. or so or less in the winter in temperate regions. Further, after the startup of the engine, in the summer, the temperature is expected to rise to +130° C. or more. Recently, the wire harnesses connecting electronic apparatuses and their controlled equipment have been reduced as a general trend. The electronic apparatuses are sometimes installed outside the vehicles as well. Therefore, the environment in which the electronic apparatuses are placed has become increasingly harsh. Therefore, the capacitors used in these electronic apparatuses have to have flat temperature characteristics over a broad temperature range. Specifically, it is not enough that the capacity-temperature characteristic satisfy the X7R characteristic of the EIA standard (−55 to 125° C., $\Delta C/C=\pm 15\%$ or less). The X8R characteristic (−55 to 150° C., $\Delta C/C=\pm 15\%$ or less) of the EIA standard must be satisfied by the dielectric ceramic composition.

Several dielectric ceramic compositions have been proposed for satisfying the X8R characteristic.

Japanese Patent Publication (A) No. 10-25157 and Japanese Patent Publication (A) No. 9-40465 propose dielectric ceramic compositions having $BaTiO_3$ as their main ingredients wherein the X8R characteristic is satisfied by having the Ba in the $BaTiO_3$ substituted by Bi, Pb, etc. so as to shift the Curie temperature to the high temperature side. Further, selecting a $BaTiO_3+CaZrO_3+ZnO+Nb_2O_5$ system formulation to satisfy the X8R characteristic has also been proposed (Japanese Patent Publication (A) No. 4-295048, Japanese Patent Publication (A) No. 4-292458, Japanese Patent Publication (A) No. 4-292459, Japanese Patent Publication (A) No. 5-109319, and Japanese Patent Publication (A) No. 6-243721).

However, each of these formulations uses the highly volatile Pb, Bi, or Zn, so requires firing in the air or another oxidizing atmosphere. For this reason, there is the problem that the internal electrodes of the capacitors cannot be made using inexpensive Ni or other base metals and require use of Pd, Au, Ag, or other expensive precious metals.

As opposed to this, for the purpose of obtaining a high dielectric constant, satisfying the X8R characteristic, and enabling firing in a reducing atmosphere, the assignee has already proposed the following dielectric ceramic composition (Japanese Patent Publication (A) No. 2000-154057). The dielectric ceramic composition described in Japanese Patent Publication (A) No. 2000-154057 has at least a main ingredient constituted by $BaTiO_3$, a first sub ingredient including at least one oxide selected from MgO, CaO, BaO, SrO, and $Cr_2O_3$, a second sub ingredient expressed by $(Ba,Ca)_xSiO_{2+x}$ (where, x=0.8 to 1.2), a third sub ingredient including at least one oxide selected from $V_2O_5$, $MoO_3$, and $WO_3$, and a fourth sub ingredient including an oxide of R1 (where, R1 is at least one type of element selected from Sc, Er, Tm, Yb, and Lu), wherein the ratios of the sub ingredient with respect to 100 moles of the main ingredient are first sub ingredient: 0.1 to 3 moles, second sub ingredient: 2 to 10 moles, third sub ingredient: 0.01 to 0.5 mole, and fourth sub ingredient: 0.5 to 7 moles (where the number of moles of the fourth sub ingredient is the ratio of R1 alone).

Further, the assignee has already proposed the following dielectric ceramic composition (Japanese Patent Publication (A) No. 2001-192264). The dielectric ceramic composition described in this Japanese Patent Publication (A) No. 2001-192264 has a main ingredient including barium titanate, a first sub ingredient including at least one oxide selected from MgO, CaO, BaO, SrO, and $Cr_2O_3$, a second sub ingredient including silicon oxide as a main ingredient, a third sub ingredient including at least one oxide selected from $V_2O_5$, $MoO_3$, and $WO_3$, a fourth sub ingredient including an oxide of R1 (where, R1 is at least one element selected from Sc, Er, Tm, Yb, and Lu), and a fifth sub ingredient including $CaZrO_3$ or $CaO+ZrO_2$, wherein the ratios of the ingredients with respect to 100 moles of the main ingredient are first sub ingredient: 0.1 to 3 moles, second sub ingredient: 2 to 10 moles, third sub ingredient: 0.01 to 0.5 mole, fourth sub ingredient: 0.5 to 7 moles (where the number of moles of the fourth sub ingredient is the ratio of R1 alone), and fifth sub ingredient: 0<fifth sub ingredient$\leqq$5 moles.

In each application of the assignee explained above, the ratio of the MgO or other first sub ingredient with respect to 100 moles of the main ingredient was 0.1 mole or more.

Further, the assignee has already proposed the following dielectric ceramic composition (Japanese Patent Publication (A) No. 2002-255639). The dielectric ceramic composition described in this Japanese Patent Publication (A) No. 2002-255639 has at least a main ingredient including barium titanate, a first sub ingredient including an oxide of AE (wherein AE is at least one element selected from Mg, Ca, Ba, and Sr), and a second sub ingredient including an oxide of R (wherein R is at least one element selected from Y, Dy, Ho, and Er), wherein the ratios of the sub ingredients with respect to 100 moles of the main ingredient are first sub ingredient: 0 mole<first sub ingredient<0.1 mole and second sub ingredient: 1 mole<second sub ingredient<7 moles.

Note that a dielectric ceramic composition not having barium titanate as its main ingredient, but having barium calcium titanate as its main ingredient, yet having a high dielectric constant, satisfying the X8R characteristic, and enabling firing in a reducing atmosphere has also been proposed (Japanese Patent Publication (A) No. 11-302072).

However, in each of the latter four publications, while the dielectric constant is high, the X8R characteristic is satisfied, and firing in a reducing atmosphere is possible, the IR temperature dependency from room temperature to a high temperature is poor and actual use as a product has been difficult.

SUMMARY OF THE INVENTION

An object of the present invention is to a provide a dielectric ceramic composition having a high relative dielectric constant, able to maintain the insulation resistance life, having a capacity-temperature characteristic satisfying the X8R characteristic of the EIA standard (−55 to 150° C., $\Delta C/C=\pm 15\%$ or less), enabling firing in a reducing atmosphere, and improved in IR temperature dependency. Another object of the present invention is to provide a multilayer ceramic capacitor or other electronic device using such a dielectric ceramic composition, able to realize smaller size and larger capacity, and able to meet demands for reduced thinness and size.

To achieve the first object, according to a first aspect of the present invention, there is provided a dielectric ceramic composition including Me (where Me is at least one element of Sr, Mg, and Ba), Ca, R (where R is a rare earth element), Ti, Mg, and Mn, the dielectric ceramic composition further having an element of A (where A is at least one element selected from the group of anionic elements with an effective ion radius at the time of hexacoordination of 0.065 nm to 0.085 nm).

According to a second aspect of the present invention, there is provided a dielectric ceramic composition having a main ingredient including a dielectric oxide expressed by the formula $\{(Me_{1-x}Ca_x)O\}_m \cdot (Zr_{1-y}Ti_y)O_2$, where the symbol Me indicating the name of the element in the formula is at least one of Sr, Mg, and Ba and where the symbols m, x, and y indicating the molar ratios of the formulation in the formula are in relationships of $0.995 \leq m \leq 1.020$, $0 < x \leq 0.15$, and $0 \leq y \leq 1.00$, a first sub ingredient including an oxide of R (where R is a rare earth element), a second sub ingredient including an oxide of Mg, and a third sub ingredient including an oxide of Mn, wherein the ratios of the sub ingredients with respect to 100 moles of the main ingredient are first sub ingredient: 0.1 to 6 moles (value converted to oxide of R), second sub ingredient: 0.1 to 5 moles (value converted to oxide of Mg), and third sub ingredient: 0.1 to 2.5 moles (value converted to oxide: of Mn), the dielectric ceramic composition further having as a fourth sub ingredient an oxide of A (where A is at least one type of element selected from the group of anionic elements having an effective ion radius at the time of hexacoordination of 0.065 nm to 0.085 nm).

Preferably, the ratio of the fourth sub ingredient with respect to 100 moles of the main ingredient is 0 to 3.5 moles (excluding 0 mole and 3.5 moles, value converted to oxide of A).

Preferably, the A is at least one type of element selected from the group of anionic elements of Al, Cr, Ga, and Ge.

Preferably, the R is at least one type of element selected from the group of elements of Y, Gd, Tb, Dy, Ho, Er, and Yb.

Preferably, the composition further has as a fifth sub ingredient an oxide of V, the content of the fifth sub ingredient being 0.01 to 0.1 mole with respect to 100. moles of the main ingredient.

Preferably, the composition further has as a sixth sub ingredient a sintering aid having $SiO_2$ as its main ingredient, the content of the sixth sub ingredient being 1 to 10 moles with respect to 100 moles of the main ingredient.

The dielectric particles (composite oxides) forming the dielectric ceramic composition according to the present invention preferably are controlled to an average crystal grain size of 1 μm or less. This average crystal grain size is calculated, for example, by the cord method etc. The dielectric particles may be controlled in average crystal grain size by controlling the types and amounts added of the sub ingredient materials and the calcining conditions when calcining the main ingredient material included in the dielectric ceramic composition.

The electronic device according to the present invention is not particularly limited so long as it is an electronic device having dielectric layers, for example, is a multilayer ceramic capacitor device having a capacitor device body comprised of dielectric layers and internal electrode layers alternately stacked. In the present invention, the dielectric layers are comprised by any of the above dielectric ceramic compositions. The conductive material included in the internal electrode layers is not particularly limited, but for example is Ni or an Ni alloy.

Note that the "ion radius" described in this specification is a value based on R. D. Shannon, *Acta Crystallogr.*, A32, 751 (1976).

The inventors engaged in research relating to the specific group of elements enabling an improvement of the IR temperature dependency without adversely affecting the desired temperature characteristics (X8R characteristic) and as a result discovered that the group of anionic elements having an effective ion radius at the time of hexacoordination in a predetermined range is effective. They reached the present invention based on this discovery.

The "IR temperature dependency" is an indicator for viewing how the insulation resistance IR fluctuates with respect to changes in temperature. This IR temperature dependency can be evaluated by calculating the rate by which the IR at a predetermined temperature (for example 150° C.) changes with respect to the IR at a reference temperature (for example room temperature 25° C.) (rate of change). The smaller the rate of change among a plurality of temperatures, the better the IR temperature dependency, while the greater the rate, the worse the IR temperature dependency. Even if the temperature characteristic of the electrostatic capacity satisfies the X8R of the EIA standard, if the IR temperature dependency in the X8R temperature range (in particular, room temperature to a high temperature) is poor, practical use as a product becomes difficult.

In the present invention, as the plurality of temperatures, room temperature (25° C.) and a high temperature (150° C.) are illustrated. When the insulation resistances at these temperatures are $IR_{25}$ and $IR_{150}$, the magnitude of the "IR cancellation" shown by formula (1) is calculated to evaluate the quality of the IR temperature dependency.

$$\log(IR_{150}/IR_{25}) \tag{1}$$

In the present invention, a dielectric formulation having a high relative dielectric constant and able to satisfy the X8R has a fourth sub ingredient comprised of a specific group of elements added to it. For this reason, the dielectric ceramic composition according to the present invention satisfies the X8R characteristic and has a small IR temperature dependency from room temperature (25° C.) to a high temperature (150° C.). Specifically, for example, the IR cancellation shown by formula (1) can be made −3.00 or more (preferably −2.00 or more).

Since the dielectric ceramic composition according to the present invention has a high relative dielectric constant and has a capacity-temperature characteristic satisfying the X8R characteristic of the EIA standard, a ceramic chip capacitor or other electronic device using the dielectric ceramic composition according to the present invention can be preferably used even in an environment where it would be exposed to a high temperature such as an engine compartment of an automobile.

Further, the dielectric ceramic composition according to the present invention does not contain any highly volatile elements such as Pb, Bi, and Zn. For this reason, it can be fired in a reducing atmosphere.

That is, according to the present invention, it is possible to provide a dielectric ceramic composition having a high relative dielectric constant, able to maintain the insulation resistance life, having a capacity-temperature characteristic satisfying the X8R characteristic of the EIA standard, able to be fired in a reducing atmosphere, and improved in IR temperature dependency.

When using the dielectric ceramic composition according to the present invention to produce a ceramic chip capacitor or other electronic device, use of internal electrodes made of Ni, Ni alloy, or another base metal becomes possible and the electronic device can be reduced in cost. Further, even if firing the dielectric ceramic composition in a reducing atmosphere, the obtained electronic device satisfies the X8R characteristic, has a good capacity aging characteristic due to application of a DC field (=small change in capacity over time), has little degradation of the insulation resistance, and is superior in reliability.

That is, a multilayer ceramic capacitor or other electronic device having dielectric layers comprised of the dielectric ceramic composition according to the present invention can stably operate inside various types of apparatuses used in harsh environments such as automotive electronic apparatuses, so can remarkably improve the reliability of the apparatuses to which they are applied.

Due to the above, the dielectric formulation of the present invention can be expected to be promising as a technique for suppressing deterioration of the rate of temperature change in the high temperature region accompanying the increased thinness of dielectric layers.

Further, the dielectric ceramic composition according to the present invention has a long insulation resistance life and a stable DC bias characteristic (dependency of dielectric constant on application of DC voltage) and TC bias characteristic (capacity-temperature characteristic at time of application of DC voltage). In particular, addition of the fourth sub ingredient is observed to remarkably improve the TC bias characteristic.

Still further, the dielectric ceramic composition according to the present invention does not contain Pb, Bi, or other harmful substances, so has little detrimental effect on the environment due to disposal after use.

Therefore, by using the dielectric ceramic composition according to the present invention, it becomes easy to provide a multilayer ceramic capacitor or other electronic device having superior characteristics. Further, by using the dielectric ceramic composition according to the present invention, even if making the dielectric layers thinner, the X8R characteristic can be satisfied and a drop in the insulation resistance life can be effectively prevented. Therefore., in a multilayer ceramic capacitor or other electronic device, reduction of size and increase of capacity can be realized and the demands for further reductions in thickness and size can be easily met. For this reason, mounting on a highly integrated circuit becomes easier.

In conventional dielectric ceramic compositions, the increased thinness of each dielectric layer has been accompanied with a tendency for deterioration of the high temperature side capacity-temperature characteristic. That is, the curve of capacity temperature change at the high temperature side tended to face the clockwise direction. As opposed to this, according to the present invention, the curve of capacity-temperature change at the high temperature side can be made to face the counterclockwise direction. If applying this phenomenon in an electronic device satisfying the X7R characteristic, it is possible to realize increased thinness of each dielectric layer compared with the past.

The electronic device according to the present invention is not particularly limited, but a multilayer ceramic capacitor, piezoelectric device, chip inductor, chip varistor, chip thermistor, chip resistor, or other surface mounted (SMD) chip type electronic device may be mentioned.

BRIEF DESCRIPTION OF THE DRAWINGS

Below, the present invention will be explained based on an illustrated embodiment.

DESCRIPTION OF THE PREFERRED EMBODIMENTS

Figure 1:
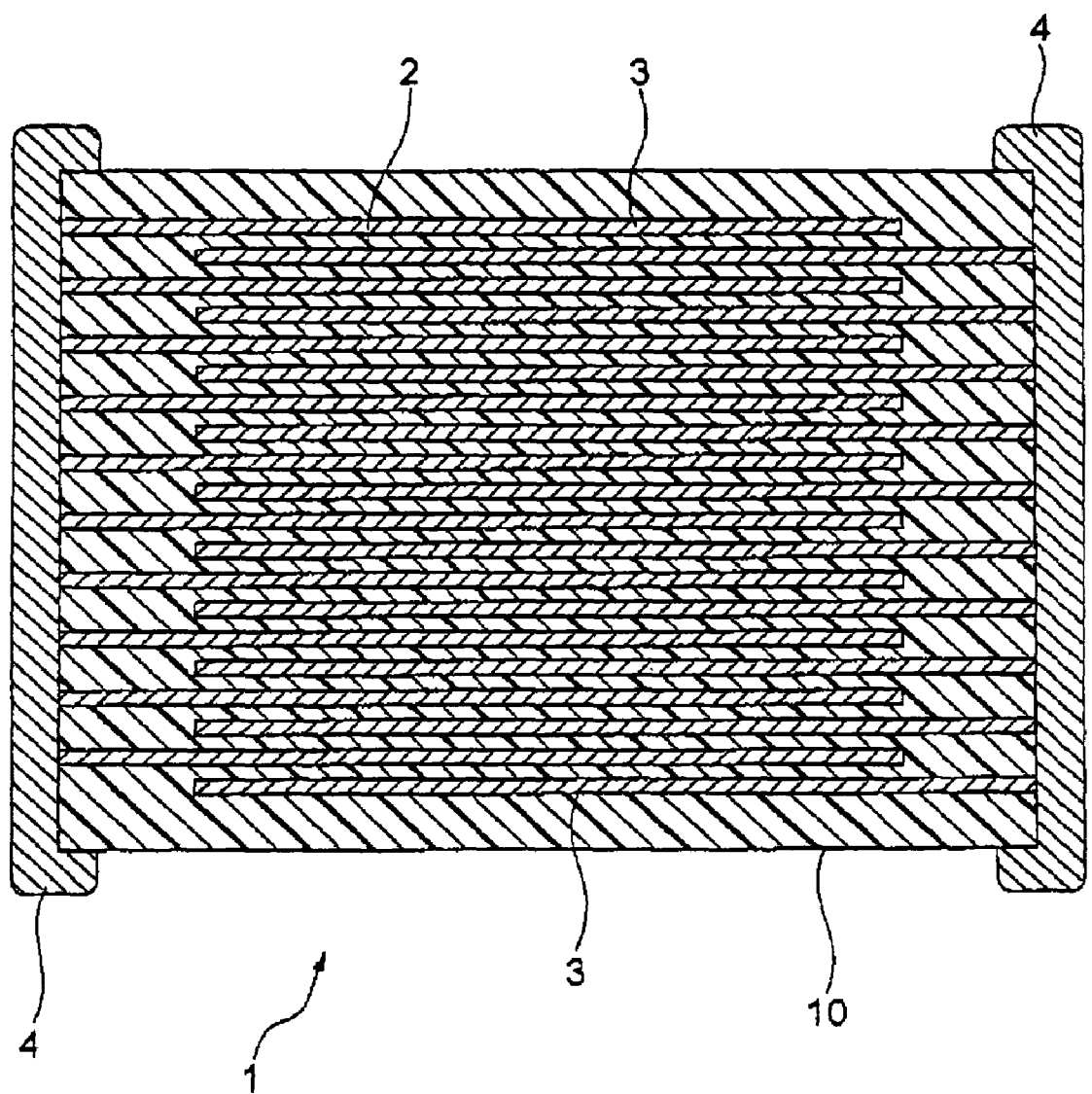
FIG. 1 is a cross-sectional view of a multilayer ceramic capacitor according to an embodiment of the present invention.

In this embodiment, as an electronic device, the multilayer ceramic capacitor 1 shown in FIG. 1 is illustrated. Its structure and method of production will be explained below.

Multilayer Ceramic Capacitor

As shown in FIG. 1, a multilayer ceramic capacitor 1 forming an electronic device according to an embodiment of the present invention has a capacitor device body 10 comprised of dielectric layers 2 and internal electrode layers 3 alternately stacked. The capacitor device body 10 is formed at its two ends with a pair of external electrodes 4 conductive with internal electrode layers 3 alternately arranged in the device body. 10. The internal electrode layers 3 are stacked so that their end faces are alternately exposed at the surfaces of the two facing ends of the capacitor device body 10. The pair of external electrodes 4 are formed at the two ends of the capacitor device body 10 and are connected to the exposed end faces of the alternately arranged internal electrode layers 3 to thereby form a capacitor circuit.

The capacitor device body 10 is not particularly limited in shape or dimensions. These may be suitably set in accordance with the application. Usually the body forms a substantially rectangular parallel piped usually of a length of 0.4 to 5.6 mm, a width of 0.2 to 5.0 mm, and a height of 0.2 to 1.9 mm or so.

Dielectric Layers

The dielectric layers 2 contain the dielectric ceramic composition according to the present invention.

The dielectric ceramic composition according to the present invention contains Me (where Me is at least one of Sr, Mg, and Ba), Ca, R (where R is a rare earth element), Ti, Mg, Mn, and A (where A is at least one type of element selected from the group of anionic elements having an effective ion radius at the time of hexacoordination of 0.065 nm to 0.085 nm). More specifically, it is as follows:

A dielectric ceramic composition according to an embodiment of the present invention has at least a main ingredient including a dielectric oxide expressed by the formula $\{(Me_{1-x}Ca_x)O\}_m \cdot (Zr_{1-y}Ti_y)O_2$, a first sub ingredient including an oxide of R (where R is a rare earth element), a second sub ingredient including an oxide of Mg, and a third sub ingredient including an oxide of Mn, and a fourth sub ingredient including an oxide of A (where A is at least one type of element selected from the group of anionic elements having an effective ion radius at the time of hexacoordination of 0.065 nm to 0.085 nm).

At this time, the amount of oxygen (O) may also deviate somewhat from the stoichiometric formulation of the above formula.

In the formula, x is $0<x\leq 0.15$, preferably $0.02\leq x\leq 0.10$. x shows the number of atoms of the symbol Me (where Me is at least one of Sr, Mg, and Ba, among which Ba is particularly preferable). By changing x, that is, the Ca/Me ratio, the crystal phase transition point can be shifted in any way. Therefore, the capacity-temperature coefficient and the relative dielectric constant can be freely controlled.

In the formula, y is $0\leq y\leq 1.00$, preferably $0.05\leq y\leq 0.80$. y shows the number of Ti atoms. By substituting the $ZrO_2$ harder to be reduced than $TiO_2$, the reduction resistance tends to be further increased. However, in the present invention, the ratio between Zr and Ti may be any ratio or just one of the two may be contained.

In the formula, m is $0.995\leq m\leq 1.020$, preferably $1.000\leq m\leq 1.006$. By making m 0.995 or more, conversion to a semiconductor due to firing under a reducing atmosphere is prevented, while by making m 1.020 or less, even without raising the firing temperature, a dense sintered body can be obtained.

Note that a dielectric oxide of the above-mentioned formula $\{(Me_{1-x}Ca_x)O\}_m \cdot (Zr_{1-y}Ti_y)O_2$ in almost all cases contains $Na_2O$, $K_2O$, or another alkali metal oxide as an impurity. It was confirmed that the content of this alkali metal oxide has a large effect on the electrical characteristics of a dielectric ceramic composition. That is, by controlling the alkali metal oxide to 0.03 wt % or less, more preferably 0.02 wt % or less, a highly reliable dielectric ceramic composition is obtained.

The fourth sub ingredient does not affect the capacity-temperature characteristic much and has the effect of improving the IR temperature dependency. The present invention is characterized in the point of being a dielectric formulation satisfying the X8R characteristic having a fourth sub ingredient comprised of specific elements added to it.

The group of anionic elements of the fourth sub ingredient includes I (0.067 nm), Ge (0.067 nm), Al (0.0675 nm), Cu (0.068 nm), Fe (0.069 nm), Ni (0.070 nm), Au (0.071 nm), As (0.072 nm), Cr (0.0755 nm), Ga (0.076 nm), At (0.076 nm), Os (0.077 nm), Nb (0.078 nm), Ta (0.078 nm), Co (0.079 nm), Rh (0.080 nm), Ir (0.082 nm), Ru (0.082 nm), and Sn (0.083 nm), but does not include P (0.052 nm) and K (0.152 nm). Note that the figures in parentheses show the effective ion radius at the time of hexacoordination. The same is true below.

Among the group of anionic elements, elements having an effective ion radius at the time of hexacoordination of 0.067 to 0.076 nm are particularly preferable. This preferable group of elements includes I, Ge, Al, Cu, Fe, Ni, Au, As, Cr, Ga, and At. More preferably, at least one type of element selected from the group of anionic elements of Al, Cr, Ga, and Ge is used. Still more preferably, Al is used. When using two or more types of elements in combination, particularly preferable combinations are Al+Cr, Al+Ga, and Al+Ge.

The content of the fourth sub ingredient is not particularly limited in the present invention. There is an effect even with a small content, but by value converted to an oxide of A, the content with respect to 100 moles of the main ingredient is preferably 0 to 3.5 moles (excluding 0 mole and 3.5 moles), more preferably 0 to 3 moles (excluding 0 mole), still more preferably 0.5 to 2 moles, particularly preferably 1 to 1.5 moles. If the content of the fourth sub ingredient is too small, the effect of improvement of the IR temperature dependency becomes insufficient. On the other hand, if the content is too great, the capacity-temperature characteristic tends to deteriorate. In particular, addition of over 1 mole of the fourth sub ingredient is observed to remarkably improve the TC bias characteristic.

The ratio of the fourth sub ingredient is not the molar ratio of A alone, but the molar ratio of the oxide of A. That is, for example when using as the fourth sub ingredient an oxide of Al, a ratio of the fourth sub ingredient of 1 mole means not that the ratio of Al is 1 mole, but that the ratio of $Al_2O_3$ is 1 mole.

Note that when using as the fourth sub ingredient two or more types of the plurality of elements (oxides), the total content should be in the above range with respect to 100 moles of the main ingredient. That is, the ratio of composition of the oxides in the fourth sub ingredient may be any ratio.

The ratios of the sub ingredients with respect to the main ingredient $BaTiO_3$ are, with respect to 100 moles of $BaTiO_3$, first sub ingredient: 0.1 to 6 moles (value converted to oxide of R), second sub ingredient: 0.1 to 5 moles (value converted to oxide of Mg), and third sub ingredient: 0.1 to 2.5 moles (value converted to oxide of Mn), preferably the first sub ingredient: 0.3 to 5.5 moles, second sub ingredient: 0.5 to 3.5 moles, and third sub ingredient: 0.3 to 1.5 moles.

Note that the ratio of the first sub ingredient is not the molar ratio of R alone, but the molar ratio of the oxide of R. That is, for example, when using as the first sub ingredient an oxide of Yb, a ratio of the first sub ingredient of 1 mole means not that the ratio of Yb is 1 mole, but that the ratio of $Yb_2O_3$ is 1 mole.

In this specification, the oxides forming the main ingredient and the sub ingredients are expressed by their stoichiometric formulations, but the states of oxidation of the oxides may also be off from the stoichiometric formulations. However, the ratios of the sub ingredients are found by conversion from the amounts of the metal included in the oxides forming the sub ingredients to the oxides of the stoichiometric formulations.

Inclusion of the first to third sub ingredients enables the high dielectric constant to be maintained while satisfying the X8R characteristic. The preferable contents of the first to third sub ingredients and the reasons for the same are explained below.

The first sub ingredient (oxide of R) exhibits the effect of causing the Curie temperature to shift to the high temperature side and the effect of flattening the capacity-temperature characteristic. If the content of the first sub ingredient is too small, such effects become insufficient and the capacity-temperature characteristic ends up becoming poor. On the other hand, if the content is too great, the sinterability tends to deteriorate. In the first sub ingredient, due to the high effect of improvement of the characteristics and the low cost, the R of the oxide included in the first sub ingredient is preferably at least one element selected from the group of Y, Gd, Tb, Dy, Ho, Er, and Yb, more preferably at least one element selected from the group of Y, Dy, and Ho.

The second sub ingredient (oxide of Mg) exhibits the effect of leveling the capacity-temperature characteristic. If the content of the second sub ingredient is too small, the rate of capacity-temperature change ends up becoming larger. On the other hand, if the content is too great, the sinterability deteriorates.

The third sub ingredient (Mn oxide) exhibits an effect of promotion of sintering, an effect of raising the IR, and an effect of improving the IR life. If the content of the second sub ingredient is too small, these effects are not sufficient exhibited. On the other hand, if the content is too large, the capacity-temperature characteristic is adversely affected.

The dielectric ceramic composition according to the present invention preferably contains, as a fifth sub ingredient, an oxide of V in an amount of 0.01 to 0.1 mole with respect to 100 moles of the main ingredient. This fifth sub ingredient (V oxide) exhibits the effect of leveling the capacity-temperature characteristic above the Curie temperature and the effect of improving the IR life. If the content of the fifth sub ingredient is too small, these effects become insufficient. On the other hand, if the content is too great, the IR remarkably drops. Note that part of the oxide of V contained in the fifth sub ingredient may also be replaced with an oxide of Nb, Ta, or another Group V element or an oxide of the Group VI elements of Cr, Mo, or W. In this case, the ratios of the oxides in the fifth sub ingredient may be any ratios.

The dielectric ceramic composition according to the present invention preferably contains as a sixth sub ingredient a sintering aid having $SiO_2$ as its main ingredient in an amount in the range of 1 to 10 moles with respect to 100 moles of the main ingredient. This sixth sub ingredient ($SiO_2$ made the main ingredient) acts mainly as a sintering aid, but also has the effect of reducing the defect rate of the initial insulation resistance at the time of reducing the thickness. If the content of the sixth sub ingredient is too small, the capacity-temperature characteristic deteriorates and the IR (insulation resistance) falls. On the other hand, if the content is too great, the IR life becomes insufficient and also a rapid drop in the dielectric constant arises.

Preferably, the sixth sub ingredient contains $SiO_2$ as the main ingredient and contains at least one type of oxide selected from MO (where M is at least one type of element selected from Ba, Ca, Sr, and Mg), $Li_2O$, and $B_2O_3$.

More preferably, the sixth sub ingredient is expressed by $(Ba,Ca)_xSiO_{2+x}$ (where, $x=0.7$ to 1.2). The composite oxide $[(Ba,Ca)_xSiO_{2+x}]$ of the more preferable embodiment of the sixth sub ingredient is low in melting point, so is good in reactivity with the main ingredient. The z in the $(Ba,Ca)_zSiO_{2+z}$ of the more preferable embodiment of the sixth sub ingredient is preferably 0.7 to 1.2, more preferably 0.8 to 1.1. If z is too small, that is, if $SiO_2$ is too great, this will react with the main ingredient and cause deterioration in the dielectric characteristics. On the other hand, if z is too large, the melting point will become higher and the sinterability will deteriorate, so this is not preferred.

Note that the ratio of Ba and Ca may be any ratio or just one may be contained as well.

The Curie temperature of the dielectric ceramic composition according to the present invention (phase transition temperature from ferroelectric to paraelectric material) may be suitably changed by selecting the formulation, but to satisfy the X8R characteristic, it is preferably at least 120° C., more preferably at least 123° C. Note that Curie temperature can be measured by DSC (differential scan calorimetry) etc.

The thickness of the dielectric layer 2 comprised of the dielectric ceramic composition according to the present invention is normally, per layer, 40 μm or less, in particular 30 μm or less. The lower limit of the thickness is normally about 0.5 μm. The dielectric ceramic composition according to the present invention is effective for improvement of the capacity-temperature characteristics of the multilayer ceramic capacitor 1 having this thinned dielectric layer 2. Note that the number of the dielectric layers is normally 2 to 300 or so.

The dielectric layer 2 is comprised of grains (dielectric particles) and grain boundary phases.

In the present embodiment, the average grain size (average crystal grain size) of the grains of the dielectric layer 2 is 1 μm or less, preferably 0.8 μm or less, more preferably 0.7 μm or less, still more preferably 0.1 μm or more, particularly more preferably 0.3 μm or more. The capacity-temperature characteristic tends-to deteriorate the thinner the dielectric layer and to deteriorate the smaller the average crystal grain size. By making the average crystal grain size finer, the IR life becomes longer and the change in capacity under a DC field along with time becomes smaller, from this viewpoint as well, the average crystal grain size is preferably small as explained above.

The grain boundaries are normally comprised of the dielectric materials or oxides of the materials forming the internal electrode materials, oxides of materials separately added, and oxides of materials entering the process as impurities and normally are a glass or glassy.

The multilayer ceramic capacitor using the dielectric ceramic composition according to the present invention is suitable for use as an electronic device for an apparatus used in an environment of 80° C. or more, in particular 125 to 150° C. Further, in this temperature range, the temperature characteristic of the capacity satisfies the R characteristic of the EIA standard and further satisfies the X8R characteristic. Further, the B characteristic of the EIAJ standard [−25 to 85° C., rate of change of capacity of within ±10% (reference temperature 20° C.)] and the X7R characteristic of the EIA standard (−55 to 125° C., $\Delta C=\pm15\%$ or less) may also be simultaneously satisfied.

Further, for example, when the insulation resistances at temperatures of room temperature (25° C.) and a high temperature (150° C.) are $IR_{25}$ and $IR_{150}$, the "IR cancellation" shown by the following formula (1) can be made −3.00 or more, preferably −2.00 or more, more preferably −1.85 or more. That is, the IR temperature dependency is small.

$$\log(IR_{150}/IR_{25}) \qquad (1)$$

In a multilayer ceramic capacitor, a dielectric layer is normally subjected to an AC field of 0.02V/μm or more, particularly 0.2V/μm or more, more particularly 0.5V/μm or more and generally 5V/μm or so or less and, superposed on this, a DC field of 5V/μm or less, but even with such fields, the temperature characteristic of the capacity is stable.

Internal Electrode Layers

The conductive material included in the internal electrode layers 3 is not particularly limited, but the material comprising the dielectric layer 2 has reduction resistance, so a base metal can be used. As the base metal used as a conductive material, Ni or an Ni alloy is preferable. As an Ni alloy, an alloy of at least one element selected from Mn, Cr, Co, and Al and Ni is preferable. The content of Ni in the alloy being 95 wt % or more is preferable.

Note that the Ni or Ni alloy may contain P or various other trace ingredients in amounts of 0.1 wt % or so or less.

The thickness of the internal electrode layers may be suitably determined in accordance with the application etc., but usually is preferably 0.5 to 5 μm, particularly 0.5 to 2.5 μm or so.

External Electrodes

The conductive material included in the external electrodes 4 is not particularly limited, but in the present invention, an inexpensive Ni, Cu, or alloy of the same may be used.

The thickness of the external electrodes may be suitably determined in accordance with the application etc., but usually 10 to 50 μm or so is preferable.

Method of Production of Multilayer Ceramic Capacitor

The multilayer ceramic capacitor using the dielectric ceramic composition according to the present invention, like a conventional multilayer ceramic capacitor, is produced by fabricating a green chip by the usual printing method or sheet method using a paste, firing this, then printing or transferring and firing external electrodes. Below, the method of production will be explained more concretely.

First, the dielectric layer paste, internal electrode paste, and external electrode paste are produced.

When producing the dielectric layer paste, first, the dielectric ceramic composition material (dielectric material) to be included in it is prepared. For the dielectric material, in accordance with the formulation of the dielectric ceramic composition according to the present invention, the material forming the main ingredient and the materials forming the first to fifth sub ingredients are used.

As the material forming the main ingredient, an oxide of Sr, Ba, Mg, Ca, Ti, or Zr and/or a compound forming the oxide upon firing is used as a single oxide or a composite oxide. In this embodiment, the case of using an oxide of Ba, Ca, or Ti and/or a compound forming such an oxide upon firing as the starting material is illustrated.

As the material forming the first sub ingredient, an oxide of R (where R is a rare earth element) is used. In this embodiment, the case of using as R at least one type of element selected from the group of elements of Y, Gd, Tb, Dy, Ho, Er, and Yb is illustrated.

As the material forming the second sub ingredient, an oxide of Mg and/or a compound forming an oxide of Mg upon firing is used as a single oxide or a composite oxide.

As the material forming the third sub ingredient, an oxide of Mn and/or a compound forming an oxide of Mn upon firing is used as a single oxide or a composite oxide.

As the material forming the fourth sub ingredient, an oxide of A (where A is at least one type of element selected from the group of anionic elements having an effective ion radius at the time of hexacoordination of 0.065 nm to 0.085 nm and/or a compound forming an oxide of A upon firing is used as a single oxide or a composite oxide. In this embodiment, the case of using as A at least one type of element selected from the group of anionic elements of Al, Cr, Ga, and Ge is illustrated.

As the material forming the fifth sub ingredient, an oxide of V oxide and/or a compound forming an oxide of V upon firing is used as a single oxide or a composite oxide.

As the material forming the sixth sub ingredient, a compound including at least $SiO_2$ and, further in accordance with need, including at least one type of oxide selected from MO (where M is at least one type of element selected from Ba, Ca, Sr, and Mg), $Li_2O$, and $B_2O_3$ is used.

Note that as a compound forming an oxide upon firing, for example a carbonate, nitrate, oxalate, organometallic compound, etc. may be mentioned. Of course, an oxide and a compound forming the oxide upon firing may also be used together. The contents of the compounds in the dielectric material may be determined so as to give the formulation of the above dielectric ceramic composition after firing. The powders of these materials usually are ones having an average grain size of 0.05 to 5 µm or so.

In this embodiment, the method of production of the dielectric material is not particularly limited. It is possible to add at least one of the sub ingredients (for example, the first sub ingredient material) before calcining the main ingredient, calcine the result, then mix in the remaining sub ingredients to obtain the dielectric ceramic composition material (advance addition). Specifically, for example, it is possible to mix the above oxide of Ba, Ca, or Ti and/or compound forming such an oxide upon firing, the starting material of the main ingredient material, and the first sub ingredient material (oxide of R), then calcine the mixture, then mix in the second to sixth sub ingredient materials to obtain the dielectric ceramic composition material (partial advance addition). Alternatively, it is possible to not add any sub ingredient to the main ingredient before calcining, produce the main ingredient, then mix in the sub ingredients to obtain the dielectric ceramic composition material (post addition).

In this embodiment, the case of using the above-mentioned partial advance addition to produce the dielectric ceramic composition material is illustrated. By using a dielectric ceramic composition material obtained by partial advance addition in this way, the average crystal grain size of the dielectric particles forming the finally obtained dielectric ceramic composition can be reduced to 1 µm or less.

Specifically, first, $BaCO_3$, $CaCO_3$, and $TiO_2$ (above, starting materials of the main ingredient material) and $R_2O_3$ (first sub ingredient material) are weighed in predetermined amounts and mixed and dried to prepare the pre-calcining material.

Next, the thus prepared pre-calcined powder is calcined. The calcining conditions are not particularly limited, but calcining under the following conditions is preferable. The rate of temperature rise is preferably 50 to 400° C./hour, more preferably 100 to 300° C./hour. The holding temperature is preferably 1000 to 1400° C. The temperature holding time is preferably 0.5 to 6 hours, more preferably 1 to 3 hours. The treatment atmosphere may be any of an air, nitrogen, and a reducing atmosphere.

Next, the calcined powder is coarsely pulverized by an alumina roll etc., then a second sub ingredient material (for example $MgCO_3$), third sub ingredient material (for example $MnCO_3$), fourth sub ingredient material (for example $Al_2O_3$), fifth sub ingredient material (for example $V_2O_5$), and sixth sub ingredient material (for example $(Ba_{0.6}Ca_{0.4})SiO_3$) are weighed in predetermined amounts and added and another sub ingredient material is added in accordance with need to obtain the final formulation. After this, this mixed powder is mixed in accordance with need by a ball mill etc. and dried to obtain a dielectric ceramic composition material (powder).

In the state before forming a coating, the grain size of the dielectric ceramic composition powder is usually an average grain size of 0.1 to 3 µm or so.

Next, this dielectric ceramic composition material is formed into a coating to prepare a dielectric layer paste. The dielectric layer paste may be an organic coating comprised of the dielectric ceramic composition material and an organic vehicle kneaded together or a water-based coating.

The organic vehicle is comprised of a binder dissolved in an organic solvent. The binder used for the organic vehicle is not particularly limited. One may be suitably selected from ethyl cellulose, polyvinyl butyral, or another usual binder. Further, the organic solvent used is also not particularly limited, but it should be suitably selected from terpineol, butyl carbitol, acetone, toluene, or other various types of organic solvents in accordance with the printing method, sheet method, or other method used.

When making the dielectric layer paste a water-based coating, a water-based vehicle comprised of a water-soluble binder, dispersant, etc. dissolved in water and the dielectric material should be kneaded together. The water-soluble binder used for the water-based vehicle is not particularly limited, but for example polyvinyl alcohol, cellulose, a water-soluble acrylic resin, etc. may be used.

The internal electrode layer paste is prepared by kneading together a conductive material comprised of the above various types of dielectric metals or their alloys or various oxides forming the above conductive material upon firing, an organometallic compound, resinate, etc. and the above organic vehicle.

The external electrode paste may be prepared in the same way as the above internal electrode layer paste.

The content of the organic vehicle in each paste is not particularly limited. The usual content is, for example, 1 to 5 wt % or so of the binder and 10 to 50 wt % or so of the solvent. Further, each paste may include, in accordance with need, an additive selected from various types of dispersants, a plasticizer, a dielectric, an insulator, etc. The total content of these is preferably 10 wt % or less.

When using the printing method, the dielectric layer paste and internal electrode layer paste are printed in multiple layers on a PET or other substrate which is then cut to a predetermined shape, then peeled off from the substrate to obtain a green chip.

Further, when using the sheet method, the dielectric layer paste is used to form a green sheet, this is printed with an internal electrode layer paste, then such sheets are stacked to obtain a green chip.

Before firing, the green chip is treated to remove the binder. The treatment for removing the binder may be suitably determined in accordance with the type of the conductive material in the internal electrode layer paste, but when using Ni or an Ni alloy or another base metal as the conductive material, making the oxygen partial pressure in the binder removing atmosphere $10^{-45}$ to $10^5$ Pa is preferable. If the oxygen partial pressure is less than that range, the effect of removal of the binder falls. Further, if the oxygen partial pressure is over that range, the internal electrode layers tend to oxidize.

As other conditions for removal of the binder, the rate of temperature rise is preferably 5 to 300° C./hour, more preferably 10 to 100° C./hour, the holding temperature is preferably 180 to 400° C., more preferably 200 to 350° C., and the temperature holding time is preferably 0.5 to 24 hours, more preferably 2 to 20 hours. Further, the firing atmosphere is preferably the air or a reducing atmosphere. As the atmosphere gas in the reducing atmosphere, for example use of a moistened mixed gas of $N_2$ and $H_2$ is preferable.

The atmosphere at the time of firing the green chip Should be suitably determined in accordance with the type of the conductive material in the internal electrode layer paste, but when using Ni or an Ni alloy or other base metal as the conductive material, the oxygen partial pressure in the firing atmosphere is preferably $10^{-7}$ to $10^{-3}$ Pa. If the oxygen partial pressure is less than that range, the conductive material of the internal electrode layers abnormally sinters and ends up disconnecting in some cases. Further, if the oxygen partial pressure is over the above range, the internal electrode layers tend to oxidize.

Further, the holding temperature at the time of firing is preferably 1100 to 1400° C., more preferably 1200 to 1380° C., still more preferably 1260 to 1360° C. If the holding temperature is less than that range, the densification becomes insufficient, while if over that range, abnormal sintering of the internal electrode layers and the resultant breakage of the electrodes, dispersion of the materials forming the internal electrode layers and the resultant deterioration of the capacity temperature characteristic, and reduction of the dielectric ceramic composition easily occur.

As other firing conditions, the rate of temperature rise is preferably 50 to 500° C./hour, more preferably 200 to 300° C./hour, the temperature holding time is preferably 0.5 to 8 hours, more preferably 1 to 3 hours, and the cooling rate is preferably 50 to 500° C./hour, more preferably 200 to 300° C./hour. Further, the firing atmosphere is preferably made a reducing atmosphere. As the atmosphere gas, for example use of a moistened mixed gas of $N_2$ and $H_2$ is preferable.

When firing in a reducing atmosphere, the capacitor device body is preferably annealed. Annealing is treatment for reoxidizing the dielectric layers. This enables the IR life to be remarkably lengthened, so the reliability is improved.

The oxygen partial pressure in the annealing atmosphere is preferably 0.1 Pa or more, particularly 0.1 to 10 Pa. If the oxygen partial pressure is less than that range, reoxidation of the dielectric layers becomes difficult, while if over that range, the internal electrode layers tend to oxidize.

The holding temperature at the time of annealing is preferably 1100° C. or less, particularly 500 to 1100° C. If the holding temperature is less than that range, the oxidation of the dielectric layer becomes insufficient, so the IR is low and the IR life easily becomes short. On the other hand, if the holding temperature is over that range, the internal electrode layers oxidize and the capacity drops. In addition, the internal electrode layer ends up reacting with the dielectric body, so the capacity-temperature characteristic easily deteriorates, the IR easily drops, and the IR life easily drops. Note that the annealing may also be comprised of a temperature raising process and temperature lowering process. That is, the temperature holding time may also be made zero. In this, the holding temperature is synonymous with the maximum temperature.

As the other annealing conditions, the temperature holding time is preferably made 0 to 20 hours, more preferably 2 to 10 hours, and the cooling rate is preferably made 50 to 500° C./hour, more preferably 100 to 300° C./hour. Further, as the atmosphere gas at the time of annealing, for example, moistened $N_2$ gas etc. is preferably used.

In the above binder removal, firing, and annealing, the $N_2$ gas or mixed gas etc. may be moistened by for example using a wetter etc. In this, the water temperature is preferably 5 to 75° C. or so.

The binder removal, firing, and annealing may be performed continuously or independently. When performing these continuously, preferably, after the binder removal, the atmosphere is changed without cooling, then the temperature is raised to the holding temperature at the time of firing, the firing is performed, then the temperature is cooled and, when reaching the holding temperature of the annealing, the atmosphere is changed and the annealing performed. On the other hand, when performing these independently, preferably, at the time of firing, the temperature is raised to the holding temperature at the time of binder removal in a $N_2$ gas or moistened $N_2$ gas atmosphere, then the atmosphere is changed and the temperature is further raised. Preferably, after cooling to the holding temperature at the time of annealing, a $N_2$ gas or a moistened $N_2$ gas atmosphere is changed to and the cooling continued. Further, at the time of annealing, the temperature may be raised to the holding temperature in an $N_2$ gas atmosphere, then the atmosphere changed or the entire annealing process may be conducted in a moistened $N_2$ gas atmosphere.

The thus obtained capacitor device body is for example polished at its end faces by barrel polishing, sand blasting, etc. and printed or transferred with external electrode paste there and fired to form external electrodes 4. The firing conditions of the external electrode paste are for example preferably firing in a moistened mixed gas of $N_2$ and $H_2$ at 600 to 800° C. for 10 minutes to 1 hour or so. Further, in accordance with need, the external electrodes 4 may be formed with coating layers on their surfaces by plating etc.

The thus produced multilayer ceramic capacitor of the present invention is mounted by soldering etc. on to a printed circuit board etc. and is used for various types of electronic apparatuses etc.

While an embodiment of the present invention was explained above, the present invention is not limited to this embodiment in any way and may be worked in various manners within a range not outside the gist of the present invention.

For example, in the above embodiment, as the electronic device according to the present invention, a multilayer ceramic capacitor was illustrated, but the electronic device according to the present invention is not limited to a multilayer ceramic capacitor and may be any device having dielectric layers comprised of the above formulation of a dielectric ceramic composition.

EXAMPLES

Next, the present invention will be further explained with reference to detailed examples, but the present invention is not limited to these examples.

Example 1

In this example, the procedure shown below was used to prepare samples of a multilayer ceramic capacitor.

Preparation of Pastes

First, starting materials for producing main ingredient materials of an average grain size of 0.1 to 1 μm ($BaCO_3$, $CaCO_3$, $TiO_2$) and first to sixth sub ingredient materials were prepared. In this example, for the MgO materials and MnO materials, a carbonate (second sub ingredient: $MgCO_3$, third sub ingredient: $MnCO_3$) was used. As other materials, oxides (first sub ingredient: $Y_2O_3$, $Dy_2O_3$, or $Ho_2O_3$, fourth sub ingredient: $Al_2O_3$, fifth sub ingredient: $V_2O_5$, sixth sub ingredient: $(Ba_{0.6}Ca_{0.4})SiO_3$ (in the tables, described as "BCG")) were used. Note that fifth sub ingredient $(Ba_{0.6}Ca_{0.4})SiO_3$ was produced by wet mixing $BaCO_3$, $CaCO_3$, and $SiO_2$ by a ball mill for 16 hours, drying the mixture, firing it at 1150° C. in the air, and further using a ball mill to wet pulverize the result for 100 hours.

Next, the starting materials for producing the main ingredient material and the first sub ingredient material ($Y_2O_3$, $Dy_2O_3$, or $Ho_2O_3$) were weighed and mixed so as to give a formulation after firing of the ratios shown in the samples of Tables 1 to 3 to prepare pre-calcined powder.

Next, this pre-calcined powder was calcined. The calcining conditions were as follows: Rate of temperature rise: 200° C./hour, holding temperature: 1200° C., temperature holding time: 2 hours, atmosphere: air.

Next, the material obtained by calcining was pulverized by an alumina roll to obtain a calcined powder. The content of the alkali metal oxide (impurities) of this calcined powder was 0.010 wt %.

Next, to the calcined powder, with respect to 100 moles of the main ingredient of this calcined powder, the amounts shown in Tables 1 to 3 of $MgCO_3$ (second sub ingredient material), $MnCO_3$ (third sub ingredient material), $Al_2O_3$ (fourth sub ingredient material), $V_2O_5$ (fifth sub ingredient), and BCG (sixth sub ingredient material) were added, and the mixture was wet mixed by a ball mill for 16 hours, then dried to obtain the final formulation of the dielectric ceramic composition material (powder, also called "dielectric material").

Next, the obtained dielectric ceramic composition material in an amount of 100 parts by weight, acrylic resin in 4.8 parts by weight, ethyl acetate in 100 parts by weight, a mineral spirit in 6 parts by weight, and toluene in 4 parts by weight were mixed by a ball mill to form a paste and thereby obtain a dielectric layer paste.

Ni particles of an average grain size of 0.1 to 0.8 μm in an amount of 100 parts by weight, an organic vehicle (ethyl cellulose of an amount of 8 parts by weight dissolved in butyl carbitol in 92 parts by weight) in 40 parts by weight, and butyl carbitol in 10 parts by weight were kneaded by a triple roll to form a paste and thereby obtain an internal electrode layer paste.

Cu particles of an average grain size of 0.5 μm in an amount of 100 parts by weight, an organic vehicle (8 parts by weight of ethyl cellulose resin dissolved in 92 parts by weight of butyl carbitol) in 35 parts by weight, and butyl carbitol in 7 parts by weight were kneaded to form a paste and thereby obtain an external electrode paste.

Preparation of Green Chip

Next, the dielectric layer paste was used to form on the PET film a green sheet of a thickness of 4.5 μm, this was printed with the internal electrode layer paste, then the green sheet was peeled off from the PET film. Next, these green sheets and protective green sheets (on which internal electrode layer paste was not printed) were stacked and press bonded to obtain a green chip. Four sheets having internal electrodes were stacked.

Next, green chips were cut to predetermined sizes, treated to remove the binder, fired, and annealed to obtain multilayer ceramic fired bodies.

The binder was removed under conditions of a rate of temperature rise of 15° C./hour, a holding temperature of 280° C., a holding time of 8 hours, and an air atmosphere.

The firing was performed under conditions of a rate of temperature rise of 200° C./hour, a holding temperature of 1280 to 1320° C., a holding time of 2 hours, a cooling rate of 300° C./hour, and a moistened $N_2+H_2$ mixed gas atmosphere (oxygen partial pressure of $10^{-9}$ atm).

The annealing was performed under conditions of a holding temperature of 900° C., a temperature holding time of 9 hours, a cooling rate of 300° C./hour, and a moistened $N_2$ gas atmosphere (oxygen partial pressure of $10^{-5}$ atm). Note that the moistening of the atmosphere gas at the time of firing and annealing was performed using a wetter set to a water temperature of 35° C.

Next, the end faces of the multilayer ceramic fired body were polished by sand blasting, then the external electrode paste was transferred to the end faces and fired in a moistened $N_2+H_2$ atmosphere at 800° C. for 10 minutes to form external electrodes and obtain a sample of the multilayer ceramic capacitor of the configuration shown in FIG. 1.

The size of each sample obtained in this way was 3.2 mm×1.6 mm×0.6 mm. The number of dielectric layers sandwiched between internal electrode layers was 4, the thickness was 3.5 μm, and the thickness of each internal electrode layer was 1.0 μm.

Each obtained capacitor sample was evaluated for IR temperature dependency (cancellation), capacity-temperature characteristic (Tc), and TC bias. The results are shown in Tables 1 to 3.

IR temperature dependency (cancellation) was evaluated by measuring the insulation resistance $IR_{150}$ at 150° C. and the insulation resistance $IR_{25}$ of 25° C. of the obtained sample and calculating the cancellation shown by the following formula 1. As the evaluation criteria, −3.00 or more was deemed good.

$$\log(IR_{150}/IR_{25}) \qquad \text{equation 1}$$

Note that the insulation resistances at the different temperatures were measured using a temperature variable IR measuring device at a measurement voltage of 7.0V/μm and a voltage application time of 60 seconds.

The capacity-temperature characteristic (Tc) was measured for the obtained sample in a temperature range of −55° C. to 150° C. by the electrostatic capacity. The electrostatic capacity was measured using a digital LCR meter (YHP 4274A) under conditions of a frequency of 1 kHz and an input signal level of 1 Vrms. Further, the rate of change of the electrostatic capacity (ΔC/C, unit %) under an environment of a temperature of 150° C. where the capacity-temperature characteristic becomes the worst in these temperature ranges was calculated and whether or not the X8R characteristic (−55 to 150° C., ΔC/C=±15% or less) was satisfied was investigated. Satisfied was indicated by ◎, while not satisfied was indicated by X.

The TC bias was evaluated for the obtained sample by a digital LCR meter (YHP 4274A) at 1 kHz, 1 Vrms, and 7.0V/μm bias voltage (DC voltage) while changing the temperature from −55° C. to 150° C. and calculating the rate of change of the electrostatic capacity from the measured value while supplying the bias voltage at 25° C. Note that electrostatic capacity was measured using an LCR meter under conditions of a frequency of 1 kHz and an input signal level of 1 Vrms. As the evaluation criteria, −50% or more was deemed as good.

Note that each capacitor sample was evaluated for the relative dielectric constant (∈), dielectric loss (tan δ), IR life under a DC field, DC insulation breakage strength, DC bias characteristic, and average crystal grain size of the dielectric particles forming the dielectric layer.

The relative dielectric constant ∈ was calculated for each capacitor sample from the electrostatic capacity (no unit) measured at a reference temperature of 25° C. by a digital LCR meter (YHP, 4274A) under conditions of a frequency of 1 kHz and input signal level (measurement voltage) of 1.0 Vrms. As a result, in each sample, a good result of more than 1000 was obtained.

The dielectric loss (tan δ) was measured for a sample of the capacitor at a reference temperature 25° C. by a digital LCR meter (YHP 4274A) under conditions of a frequency of 1 kHz and an input signal level (measurement voltage) of 1.0V rms. As a result, in each sample, a good result of 10% or less was obtained.

For the insulation resistance IR life under a DC field, each capacitor sample was subjected to an acceleration test at 200° C. under a 10V/μm field to measure the time until the insulation resistance became 1 MΩ or less. As a result, in each sample, a good result of 10 or more hours was obtained.

The DC insulation breakage strength was found by applying DC voltage to capacitor samples at a rate of temperature rise of 100V/sec, measuring the voltage when detecting a leakage current of 100 mA (DC breakdown voltage VB, unit: V/μm), and calculating the average. As a result, in each sample, a good result of at least 100V/μm was obtained.

The DC bias characteristic was found by gradually applying DC voltage to capacitor samples at a fixed temperature (25° C.), measuring the change (ΔC/C) in the electrostatic capacity at that case, and plotting the results. As a result, in each sample, it was confirmed that even when applying a high voltage, the electrostatic capacity did not fall much and a stable DC bias characteristic was exhibited.

The average crystal grain size of the dielectric particles forming the dielectric layer was calculated by the cord method. The "cord method" is the method of calculating the average crystal grain size of the dielectric particles of a sample of a capacitor from SEM photographs. In the present embodiment, the shape of the dielectric particles is assumed for convenience to be spherical to calculate the grain size. Specifically, first a SEM photograph showing the microstructure of the dielectric layer is used, any line is drawn on this SEM photograph, and the number of points where this line intersects grain boundaries present between adjoining dielectric particles (intersecting points) is found. Next, the number PL of points intersecting with the grain boundaries per unit length is calculated from the number of intersecting points found. Next, this obtained value of PL is used to calculate the cord length L3. The cord length is found by 1/PL. Next, the value of L3 obtained is multiplied with 1.5, that is, L3×1.5, to calculate the average crystal grain size of the dielectric particles. Note that the field of the SEM photograph used is made 23 μm×30 μm, five to six photographs are used for each sample to calculate the grain size, and the average value is made the average crystal grain size. As a result, in each sample, a good result of 1 μm or less was obtained.

TABLE 1

| Sample no. | Amount of addition of fourth sub ingredient (moles) | Rate of temperature change of electrostatic capacity (%) (+150° C.) | X8R characteristic | TC bias (%) | IR temperature dependency |
|---|---|---|---|---|---|
| 1* | 0 | −9.1 | ◎ | −51.2 | −3.48 |
| 2 | 0.01 | −9.3 | ◎ | −49.0 | −2.99 |
| 3 | 0.05 | −10.1 | ◎ | −47.2 | −2.94 |
| 4 | 1 | −11.9 | ◎ | −46.8 | −2.70 |
| 5 | 1.5 | −12.3 | ◎ | −43.6 | −2.51 |
| 6 | 2 | −13.0 | ◎ | −40.5 | −2.41 |
| 7 | 2.5 | −13.9 | ◎ | −37.7 | −2.38 |
| 8 | 3 | −14.5 | ◎ | −37.4 | −2.31 |
| 9** | 3.5 | −15.4 | X | −35.1 | −2.19 |
| 10** | 4 | −16.1 | X | −33.5 | −2.15 |

Samples with * marks are comparative examples of the present invention.
Samples with ** marks are reference examples of the present invention Note,
Main ingredient: $(Ba_{0.9}Ca_{0.1})_{1.004}TiO_3$
First sub ingredient: $Y_2O_3$=2 moles
Second sub ingredient: $MgCO_3$=1.2 moles
Third sub ingredient: $MnCO_3$=0.5 mole
Fourth sub ingredient: $Al_2O_3$
Fifth sub ingredient: $V_2O_5$=0.05 mole
Sixth sub ingredient: $(Ba_{0.6}, Ca_{0.4})SiO_3$=3.0 moles
The above amounts of addition are amounts of addition with respect to 100 moles of the main ingredient.

TABLE 2

| Sample no. | Amount of addition of fourth sub ingredient (moles) | Rate of temperature change of electrostatic capacity (%) (+150° C.) | X8R characteristic | TC bias (%) | IR temperature dependency |
|---|---|---|---|---|---|
| 11* | 0 | −10.5 | ◎ | −50.5 | −3.58 |
| 12 | 0.01 | −10.1 | ◎ | −47.8 | −2.99 |
| 13 | 0.5 | −11.5 | ◎ | −46.7 | −2.98 |
| 14 | 1 | −12.7 | ◎ | −45.2 | −2.75 |
| 15 | 1.5 | −13.4 | ◎ | −42.1 | −2.56 |
| 16 | 2 | −13.8 | ◎ | −39.7 | −2.45 |
| 17 | 2.5 | −14.3 | ◎ | −37.1 | −2.41 |
| 18 | 3 | −14.9 | ◎ | −36.1 | −2.39 |
| 19** | 3.5 | −15.6 | X | −34.7 | −2.21 |
| 20** | 4 | −16.8 | X | −32.1 | −2.19 |

Samples with * marks are comparative examples of the present invention.
Samples with ** marks are reference examples of the present invention Note, the formulation of the main ingredient and the formulations and amounts of addition of the second, third, fifth, and sixth sub ingredients are the same as in Table 1
First sub ingredient: $Dy_2O_3$=2 moles
Fourth sub ingredient: $Al_2O_3$

TABLE 3

| Sample no. | Amount of addition of fourth sub ingredient (moles) | Rate of temperature change of electrostatic capacity (%) (+150° C.) | X8R characteristic | TC bias (%) | IR temperature dependency |
|---|---|---|---|---|---|
| 21* | 0 | −9.3 | ◎ | −50.9 | −3.59 |
| 22 | 0.01 | −9.6 | ◎ | −48.9 | −2.99 |
| 23 | 0.5 | −10.4 | ◎ | −47.2 | −2.96 |
| 24 | 1 | −12.3 | ◎ | −46.8 | −2.73 |
| 25 | 1.5 | −12.7 | ◎ | −43.6 | −2.56 |
| 26 | 2 | −13.4 | ◎ | −40.5 | −2.46 |
| 27 | 2.5 | −14.2 | ◎ | −37.7 | −2.41 |
| 28 | 3 | −14.8 | ◎ | −37.4 | −2.34 |
| 29** | 3.5 | −15.8 | X | −35.1 | −2.25 |
| 30** | 4 | −16.7 | X | −33.5 | −2.19 |

Samples with * marks are comparative examples of the present invention.
Samples with ** marks are reference examples of the present invention Note, the formulation of the main ingredient and the formulations and amounts of addition of the second, third, fifth, and sixth sub ingredients are the same as in Table 1

First sub ingredient: $Ho_2O_3$=2 moles
Fourth sub ingredient: $Al_2O_3$

As shown in Tables 1 to 3, by adding the fourth sub ingredient, even in a small amount, an effect of improvement of the cancellation of the IR was seen (IR cancellation of −3.00 or more). In particular, by making the content of the fourth sub ingredient at least 0.5 mole with respect to 100 moles of the main ingredient, it is possible to make the IR cancellation −2.00 or more. Making it 3 moles or less enables the X8R characteristic to be satisfied, it could be confirmed.

Example 2

Except for changing the type and content of the fourth sub ingredient material as shown in Tables 4 to 7, the same procedure was followed as in Example 1 to prepare and evaluate different capacitor samples.

TABLE 4

| Sample no. | Amount of addition of fourth sub ingredient (moles) | Rate of temperature change of electrostatic capacity (%) (+150° C.) | X8R characteristic | TC bias (%) | IR temperature dependency |
|---|---|---|---|---|---|
| 1* | 0 | −9.1 | ◎ | −50.9 | −3.48 |
| 32 | 0.01 | −9.2 | ◎ | −49.0 | −2.99 |
| 33 | 0.5 | −9.8 | ◎ | −48.2 | −2.97 |
| 34 | 1 | −10.4 | ◎ | −47.1 | −2.78 |
| 35 | 1.5 | −11.7 | ◎ | −44.0 | −2.54 |
| 36 | 2 | −12.5 | ◎ | −41.5 | −2.45 |
| 37 | 2.5 | −13.1 | ◎ | −38.1 | −2.45 |
| 38 | 3 | −14.2 | ◎ | −37.8 | −2.37 |
| 39** | 3.5 | −15.2 | X | −35.6 | −2.27 |
| 40** | 4 | −16.4 | X | −34.1 | −2.25 |

Samples with * marks are comparative examples of the present invention.
Samples with ** marks are reference examples of the present invention Note, the formulation of the main ingredient and the formulations and amounts of addition of the first to third, fifth, and sixth sub ingredients are the same as in Table 1

Fourth sub ingredient: $Cr_2O_3$

TABLE 5

| Sample no. | Amount of addition of fourth sub ingredient (moles) | Rate of temperature change of electrostatic capacity (%) (+150° C.) | X8R characteristic | TC bias (%) | IR temperature dependency |
|---|---|---|---|---|---|
| 1* | 0 | −9.1 | ◎ | −50.5 | −3.48 |
| 42 | 0.01 | −9.5 | ◎ | −48.9 | −2.99 |
| 43 | 0.5 | −9.9 | ◎ | −48.1 | −2.98 |
| 44 | 1 | −10.8 | ◎ | −47.3 | −2.75 |
| 45 | 1.5 | −12.0 | ◎ | −44.1 | −2.51 |
| 46 | 2 | −12.9 | ◎ | −41.8 | −2.41 |
| 47 | 2.5 | −13.5 | ◎ | −38.4 | −2.40 |
| 48 | 3 | −14.8 | ◎ | −38.1 | −2.31 |
| 49** | 3.5 | −15.9 | X | −36.4 | −2.23 |
| 50** | 4 | −16.9 | X | −34.9 | −2.23 |

Samples with * marks are comparative examples of the present invention.
Samples with ** marks are reference examples of the present invention Note, the formulation of the main ingredient and the formulations and amounts of addition of the first to third, fifth, and sixth sub ingredients are the same as in Table 1

Fourth sub ingredient: $Ge_2O_2$

TABLE 6

| Sample no. | Amount of addition of fourth sub ingredient (moles) | Rate of temperature change of electrostatic capacity (%) (+150° C.) | X8R characteristic | TC bias (%) | IR temperature dependency |
|---|---|---|---|---|---|
| 1* | 0 | −9.1 | ◎ | −50.5 | −3.48 |
| 52 | 0.01 | −9.3 | ◎ | −49.1 | −2.99 |
| 53 | 0.5 | −10.0 | ◎ | −47.9 | −2.98 |
| 54 | 1 | −10.9 | ◎ | −47.1 | −2.75 |
| 55 | 1.5 | −12.4 | ◎ | −43.9 | −2.51 |
| 56 | 2 | −13.1 | ◎ | −41.1 | −2.41 |
| 57 | 2.5 | −14.5 | ◎ | −38.0 | −2.40 |
| 58 | 3 | −14.8 | ◎ | −37.2 | −2.31 |
| 59** | 3.5 | −16.0 | X | −36.0 | −2.23 |
| 60** | 4 | −17.1 | X | −34.0 | −2.23 |

Samples with * marks are comparative examples of the present invention.
Samples with ** marks are reference examples of the present invention Note, the formulation of the main ingredient and the formulations and amounts of addition of the first to third, fifth, and sixth sub ingredients are the same as in Table 1

Fourth sub ingredient: $Ga_2O_3$

As shown in Tables 4 to 6, it is confirmed that even if changing the fourth sub ingredient material to $Cr_2O_3$, $Ge_2O_2$, or $Ga_2O_3$, the same effects as with the $Al_2O_3$ of Example 1 are obtained.

TABLE 7

| Sample no. | Amount of add. of fourth sub ingredient (moles) $Al_2O_3$ | $Cr_2O_3$ | Rate of temp. change of electrostatic capacity (%) (+150° C.) | X8R characteristic | TC bias (%) | IR temp. dependency |
|---|---|---|---|---|---|---|
| 1* | 0 | 0 | −9.1 | ◎ | −50.5 | −3.48 |
| 62 | 1 | 0.25 | −12.3 | ◎ | −46.9 | −2.69 |
| 63 | 1 | 0.5 | −12.9 | ◎ | −42.0 | −2.51 |
| 64 | 1 | 0.75 | −13.1 | ◎ | −41.3 | −2.32 |

TABLE 7-continued

| Sample no. | Amount of add. of fourth sub ingredient (moles) | | Rate of temp. change of electrostatic capacity (%) (+150° C.) | X8R characteristic | TC bias (%) | IR temp. depen- dency |
|---|---|---|---|---|---|---|
| | $Al_2O_3$ | $Cr_2O_3$ | | | | |
| 65 | 1 | 1 | −13.4 | ◎ | −40.9 | −2.26 |
| 66 | 1 | 1.5 | −14.0 | ◎ | −38.3 | −2.15 |
| 67 | 1 | 2 | −14.6 | ◎ | −37.8 | −2.09 |
| 68** | 1 | 3 | −16.7 | X | −33.9 | −1.89 |
| 69** | 1 | 3.5 | −18.1 | X | −33.6 | −1.80 |

Samples with * marks are comparative examples of the present invention.
Samples with ** marks are reference examples of the present invention Note, the formulation of the main ingredient and the formulations and amounts of addition of the first to third, fifth, and sixth sub ingredients are the same as in Table 1

Fourth sub ingredient: $Al_2O_3+Cr_2O_3$

As shown in Table 7, it is confirmed that even if changing the fourth sub ingredient material to a composite form of $Al_2O_3$ and $Cr_2O_3$, the same effects as with addition of the $Al_2O_3$ of Example 1 alone are obtained.

Comparative Example 1

Except for changing the type and content of the fourth sub ingredient material as shown in Table 8, the same procedure was followed as in Example 1 to prepare and evaluate different capacitor samples.

TABLE 8

| Sample no. | Amount of add. of fourth sub ingredient (moles) | | Rate of temp. change of electrostatic capacity (%) (+150° C.) | X8R characteristic | TC bias (%) | IR temp. dependency |
|---|---|---|---|---|---|---|
| | $P_2O_5$ | $K_2O$ | | | | |
| 71* | 0.5 | — | −13.9 | ◎ | −52.1 | −3.67 |
| 72* | 1 | — | −14.6 | ◎ | −55.5 | −3.80 |
| 73* | 1.5 | — | −17.9 | X | −57.2 | −3.91 |
| 74* | — | 0.5 | −13.8 | ◎ | −53.3 | −3.81 |
| 75* | — | 1 | −15.9 | X | −56.1 | −3.92 |

Samples with * marks are comparative examples of the present invention.

Note, the formulation of the main ingredient and the formulations and amounts of addition of the first to third, fifth, and sixth sub ingredients are the same as in Table 1

Fourth sub ingredient: $P_2O_5$ or $K_2O$

As shown in Table 8, when changing to an anionic element P (0.052 nm) or K (0.152 nm) with an effective ion radius at the time of hexacoordination outside the suitable range, even if making the content a suitable range, it was confirmed that the effect of addition of the fourth sub ingredient could not be obtained.

The invention claimed is:

1. A dielectric ceramic composition having a main ingredient including a dielectric oxide expressed by the formula $\{(Me_{1-x}Ca_x)O\}_m \cdot (Zr_{1-y}Ti_y)O_2$, where the symbol Me is at least one of Sr, Mg, and Ba and where the symbols m, x, and y indicating the molar ratios of the formulation in the formula are in relationships of $0.995 \leq m \leq 1.020$, $0 < x \leq 0.15$, and $0 \leq y \leq 1.00$,
   a first sub ingredient including an oxide of a rare earth element R,
   a second sub ingredient including an oxide of Mg, and
   a third sub ingredient including an oxide of Mn, wherein the ratios of the sub ingredients with respect to 100 moles of the main ingredient are:
   first sub ingredient: 0.1 to 6 moles in terms of value converted to oxide of R,
   second sub ingredient: 0.1 to 5 moles in terms of value converted to oxide of Mg, and
   third sub ingredient: 0.1 to 2.5 moles in terms of value converted to oxide of Mn,
   said dielectric ceramic composition further having as a fourth sub ingredient an oxide of A, wherein A is at least one element selected from the group of anionic elements having an effective ion radius at the time of hexacoordination of 0.065 nm to 0.085 nm, being selected from the group consisting of In, Ge, Al, Cu, Fe, Ni, Au, As, Cr, Ga, At, Os, Nb, Ta, Co, Rh, Ir, Ru and Sn,
   said dielectric ceramic composition further having as a fifth sub ingredient an oxide of V, the content of said fifth sub ingredient being 0.01 to 0.1 mole with respect to 100 moles of the main ingredient, and
   said dielectric composition further having as a sixth sub ingredient a sintering aid being $(BaCa)_xSiO_{2+x}$, wherein x is 0.7 to 1.2, the ratio of Ba and Ca being any ratio.

2. The dielectric ceramic composition as set forth in claim 1, wherein the ratio of the fourth sub ingredient with respect to 100 moles of the main ingredient is 0 to 3.5 moles excluding 0 mole and 3.5 moles, in terms of value converted to oxide of A.

3. The dielectric ceramic composition as set forth in claim 1, wherein said A is at least one element selected from the group of anionic elements of Al, Cr, Ga, and Ge.

4. The dielectric ceramic composition as set forth in claim 1, wherein said R is at least one element selected from the group of elements of Y, Gd, Tb, Dy, Ho, Er, and Yb.

5. The dielectric ceramic composition as set forth in claim 1, wherein the content of said sixth sub ingredient being 1 to 10 moles with respect to 100 moles of the main ingredient.

6. The dielectric ceramic composition as set forth in claim 1, further having dielectric grains having an average crystal grain size of 1 μm or less.

7. An electronic device having dielectric layers comprised of a dielectric ceramic composition, said dielectric ceramic composition being comprised of dielectric ceramic composition as set forth in claim 1.

8. A multilayer ceramic capacitor having a capacitor device body comprised of dielectric layers comprised of a ceramic composition and internal electrode layers alternately stacked, wherein
   said dielectric ceramic composition is comprised of a dielectric ceramic composition as set forth in claim 1.

9. The multilayer ceramic capacitor as set forth in claim 8, wherein said internal electrode layers have nickel or a nickel alloy as their main ingredients.

* * * * *